United States Patent [19]
Zinck

[11] 4,429,647
[45] Feb. 7, 1984

[54] METHOD OF AND DEVICE FOR LOOSENING AGRICULTURALLY USED SOIL

[76] Inventor: Eugen Zinck, Hüffelsheimerstrasse 2, 6550 Bad Kreuznach, Fed. Rep. of Germany

[21] Appl. No.: 445,661

[22] Filed: Nov. 30, 1982

Related U.S. Application Data

[63] Continuation of Ser. No. 179,164, Aug. 18, 1980, abandoned, which is a continuation of Ser. No. 944,370, Sep. 28, 1978, abandoned.

[51] Int. Cl.³ .................................. A01C 23/02
[52] U.S. Cl. .................................. 111/6; 47/58; 111/7.1
[58] Field of Search .......... 47/58; 111/7.1–7.4

[56] References Cited

U.S. PATENT DOCUMENTS

| | | | |
|---|---|---|---|
| 1,677,153 | 7/1928 | Spencer | 47/58 |
| 2,323,773 | 7/1943 | Irish | 111/7.1 |
| 3,303,800 | 2/1967 | Young | 111/7.1 |
| 3,659,536 | 5/1972 | White | 111/7.1 |

FOREIGN PATENT DOCUMENTS

| | | |
|---|---|---|
| 197116 | 4/1958 | Austria . |
| 798638 | 11/1968 | Canada . |
| 804331 | 1/1969 | Canada . |
| 1052149 | 3/1959 | Fed. Rep. of Germany . |
| 1582110 | 4/1970 | Fed. Rep. of Germany . |
| 1582692 | 6/1970 | Fed. Rep. of Germany . |
| 2021996 | 11/1970 | Fed. Rep. of Germany . |
| 2121242 | 11/1971 | Fed. Rep. of Germany . |
| 2149650 | 3/1973 | France . |
| 414698 | 8/1934 | United Kingdom . |

*Primary Examiner*—Robert E. Bagwill
*Attorney, Agent, or Firm*—Schwartz, Jeffery, Schwaab, Mack, Blumenthal & Koch

[57] ABSTRACT

A method of and device for loosening agriculturally used soil, especially for loosening in depth compacted agriculturally used soil, according to which a current of compressed air is introduced into the soil to be loosened and is released in or below a minimum depth of loosening thereby breaking-up the soil by the freed and following compressed air. The device for practicing the above outlined method includes primarily a probe adapted into the soil to be loosened. This probe has associated therewith a compressed air conveying conduit. The probe is within the region of its end provided with at least one air outlet.

5 Claims, 8 Drawing Figures

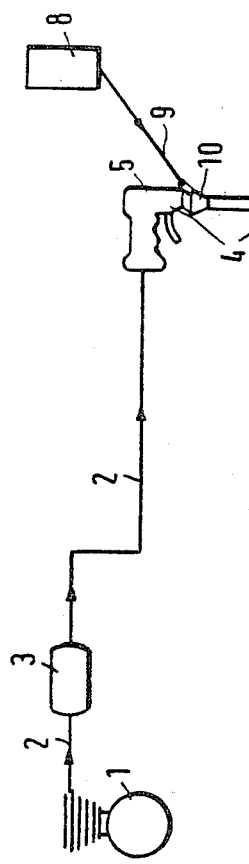
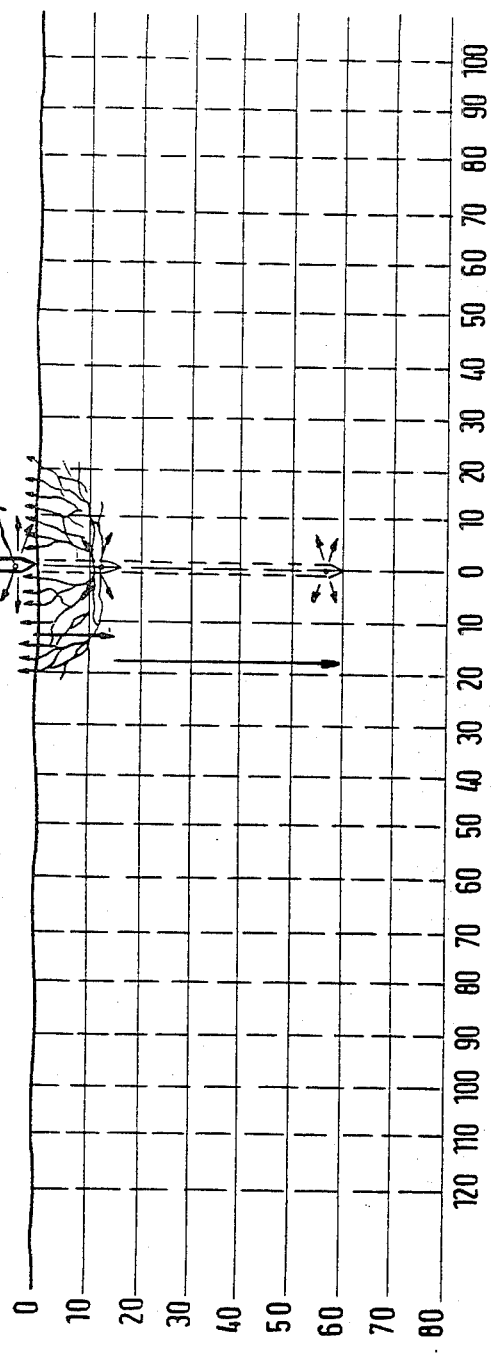
Fig. 3a

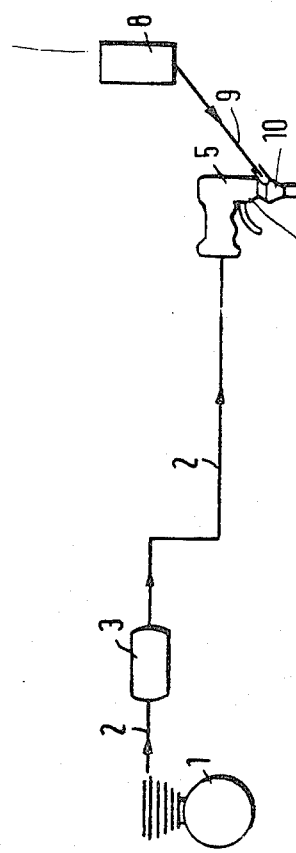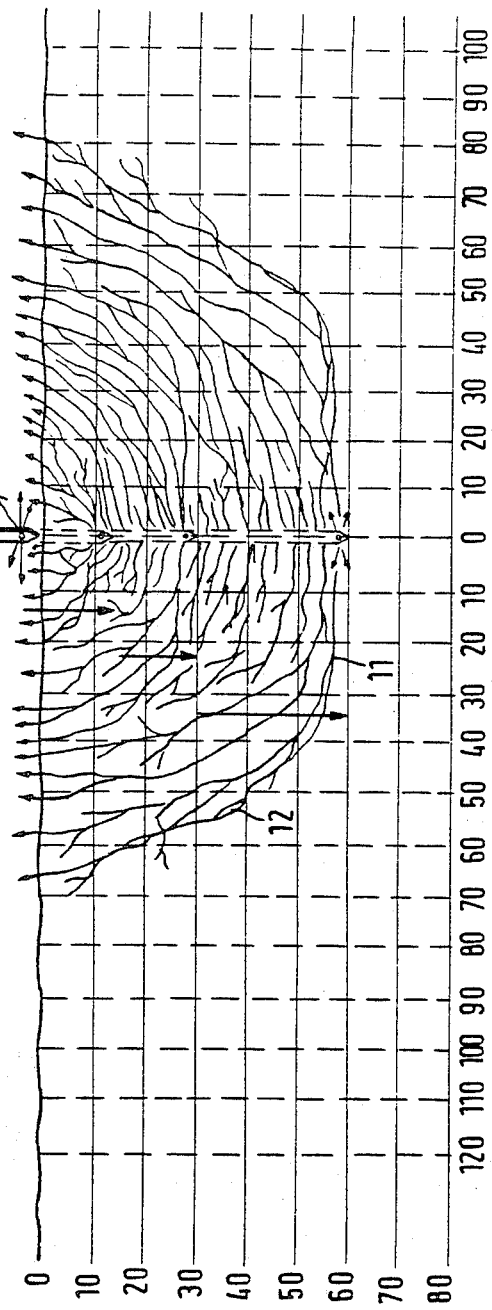
Fig.3c

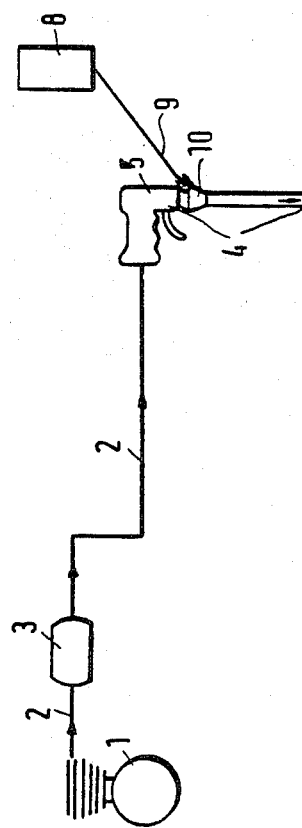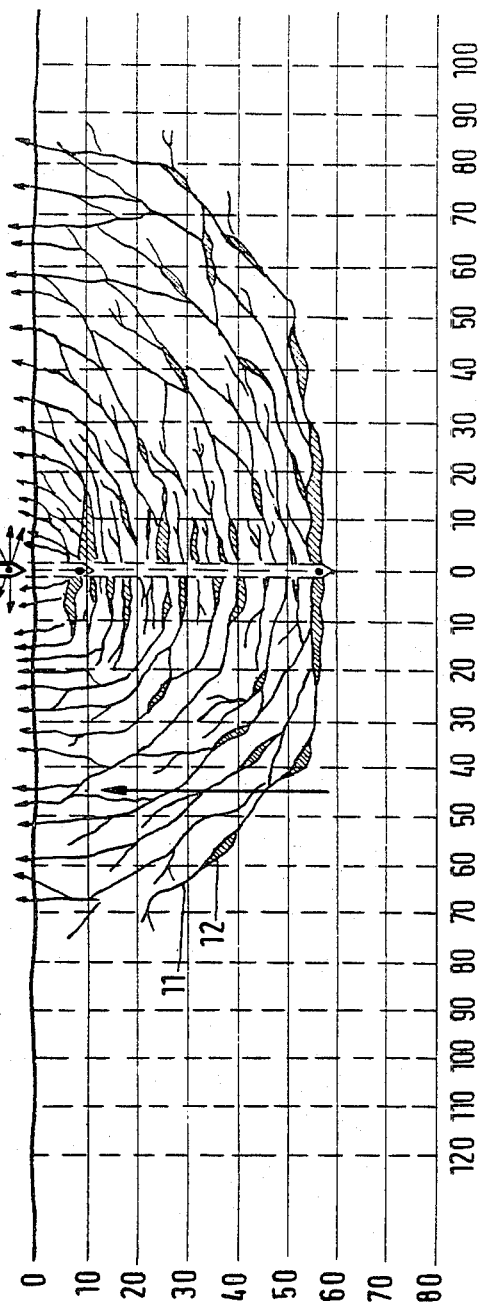
Fig. 4

METHOD OF AND DEVICE FOR LOOSENING AGRICULTURALLY USED SOIL

This is a continuation of application Ser. No. 179,164, filed Aug. 18, 1980, which is in turn a continuation of application Ser. No. 944,370 filed Sept. 28, 1978 (both abandoned).

The present invention relates to a method of loosening agriculturally used soil, especially for loosening in depth compacted agriculturally used soil, and also concerns a device for practicing said method.

For loosening cultivated soil, especially agriculturally used soil, numerous devices have been developed. Starting from the primitive tools such as digging stick (Grabstock) and fist wedge up to modern plow, earth cutting machine or spading machine, the heretofore known soil loosening devices or implements are based on the principle by means of as hard as possible sharp and pointed tool mechanically to tear open the soil, to loosen it, to stir it, or to turn it over. In this connection, always with more or less force the soil is attacked and its grown structure is destroyed. For the soil layer located below the seed bed proper, a mere loosening of the prevalent structure should be effected. This has become apparent at the latest since modern research concerning biological connections and conditions. Nevertheless, no principal change has been effected in the above mentioned working method, and said methods are still used for loosening in depth, in connection with particularly heavy implements, and also for preparing the seed beds.

Attempts have been made by using mineral fertilizers in ever increasing quantities for offsetting the drawbacks resulting from the above mentioned soil treatment and from the inherent destruction of the soil as natural organism.

However, tests have proved that the natural soil life and the natural soil structure cannot over a longer period of time be replaced, even by considerable addition of fertilizers, and that the yield in spite of an excessive addition of suitable mineral vertilizers begins to drop. In particular, also a reduction in the yields as to their biological value is noticed as has been noticed in view of growth difficulties encountered in so-called master experimental farms.

It is, therefore, an object of the present invention to provide a method of loosening agriculturally used soil, which will not only overcome the above mentioned drawbacks and lead to sound soil in its natural structure, but over a long range will be able to restore destroyed soil again to is sound structure and will not only be comparable economically with heretofore known methods but will far surpass the same at least with regard to the required energy input.

These and other objects and advantages of the invention will appear more clearly from the following specification in connection with the accompanying drawings, in which:

FIG. 1 diagrammatically illustrates a device according to the invention and its employment in connection with the improvement of the permeability of deeper soil layers concerning the elimination of water accumulation.

FIG. 2 shows a device similar to that of FIG. 1 during the introduction of particularly organic filling or fertilizer material, mineral fertilizer or the like into the loosened soil.

FIGS. 3a–3c respectively diagrammatically illustrates the device according to FIG. 1 in connection with a general, especially narrow mesh soil loosening, and soil aeration in three different phases.

FIG. 4 is a device according to FIG. 1 shown in connection with the introduction especially of organic filling or fertilizers, mineral fertilizers or the like in soil loosened in conformity with FIGS. 3a–3c.

Figure 1:
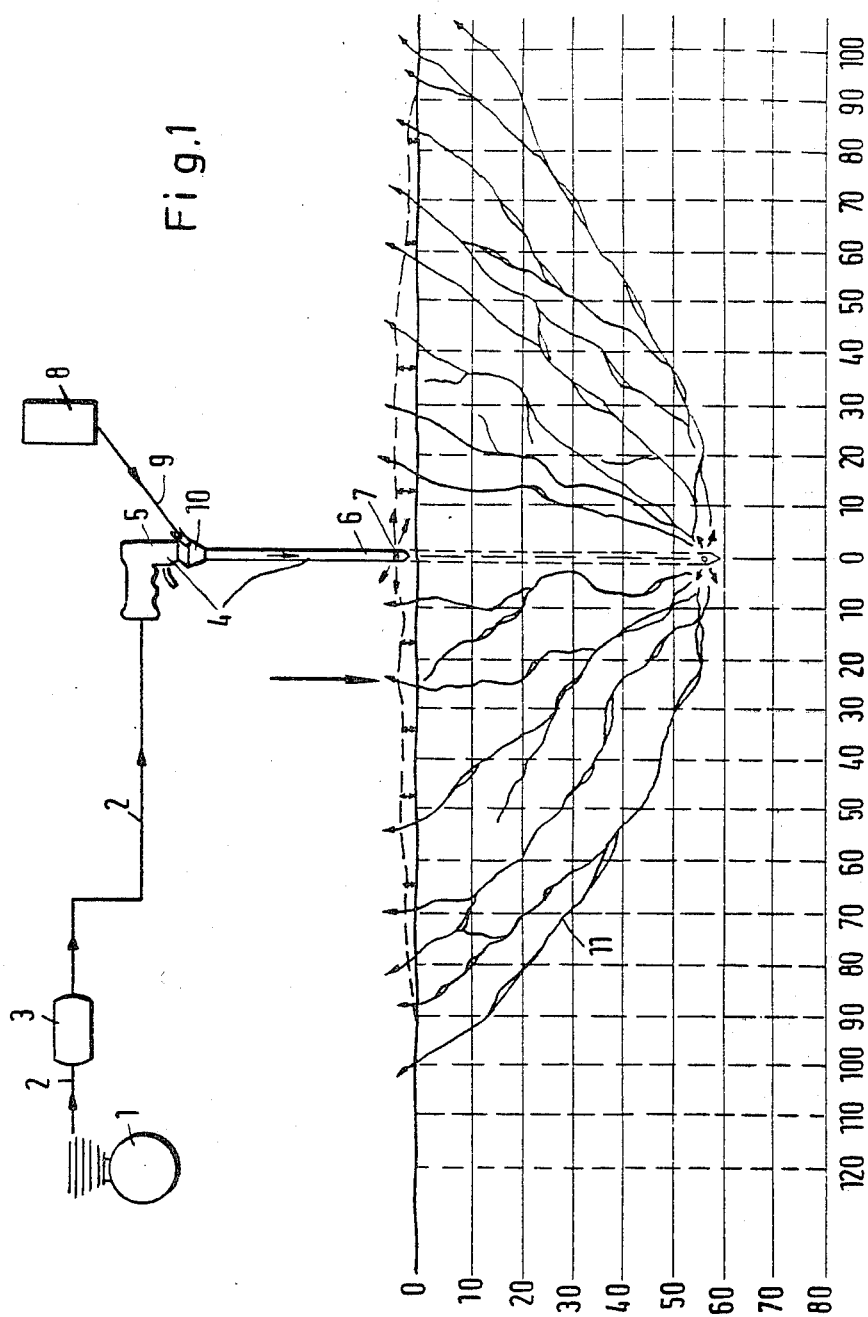

The method according to the present invention is characterized primarily by an aimed introduction of a current of compressed air into the soil, the release of the compressed air in or below at a minimum loosening depth, and the breaking open of the soil by the released and compressed air following the same.

The breaking open of soil in comformity with the present invention does not in any way damage the soil structure but merely brings about a loosening of the prevailing structure. More specifically, in contrast to the use of hard, sharp or pointed tools, the soil is not cut at random or at will in its structure and destroyed but by means of the pressure forces build up by the introduced compressed air, is merely broken open. The breaking open of the soil is effected along its preformed break areas, the seam areas of the soil particles.

Thus, in conformity with the present invention, the soil structure is for all practical purposes maintained, and correspondingly the life of the soil is not affected as is the case for instance with mechanical soil treating methods according to which the broken open soil is directly suddenly exposed to the sun rays or etching fertilizer solutions.

Aside from the fact that the diminution or breaking up of the soil is not effected by force but merely along organically predrawn breaking lines and is torn up and made permeable in this way, the soil due to the blowing in of air is thoroughly and deeply aerated and permeated with oxygen.

At the same time, the method according to the invention also offers the possibility of maintaining the soil structure permanently in the obtained form, inasmuch as suitable substances, especially organic substances such as humus, peat or the like are as filling materials or filling and/or fertilizer substances likewise introduced. These substances accumulate at the created hollow spaces, fill the same and see to it that these hollow spaces will remain as water and air permeable veins and passages.

The method according to the invention may be employed for breaking up the soil over wide surfaces in a coarse way as well as for breaking up the soil in a fine narrow mesh manner and is particularly suitable to break up deep-lying compacted zones. This applies to compacted soil of any type and with moist soil simultaneously brings about a certain drainage.

If the soil is to be broken up over a wide surface, the compressed air introduced into the soil is preferably released only after the intended depth of the soil to be loosened has been reached, and this release is effected possibly in a shock-like manner at full air pressure. Due to this release over as large a cross section as possible, an eruption-like wide surface breaking up is realized.

Depending on the type and condition of the soil, up to a plurality of square meters soil surface can easily be lifted and be broken up while forming tears. The effect is all the greater the denser the soil. This employment manner therefore makes possible a quick elimination or reduction of coarse faults in the soil structure in larger areas. Inasmuch as the breaking up is effected over relatively wide surfaces, the distances at which compressed air is introduced into the soil can be relatively wide and preferably of a magnitude of about 1 meter. The pressures applied in such instances, are preferably within the range of from 5 to 12 atmospheres and can particularly for breaking up greatly damaged and highly compacted soil be even higher than 12 atmospheres.

If a finer, narrow meshed breaking up is desired, it is expedient to release the compressed air introduced into the soil from a minimum loosening depth on as determined by the soil property, and subsequently to increase the loosening depth up to a predetermined end loosening depth while air is continuously supplied. With such a process, the soil breaks up over less wide surfaces, and consequently also the distances are less at which the air is introduced into the soil. Preferably, these distances vary from 40 to 60 cm.

The results of the method according to the invention extend not only over a relatively long time but are also directly noticeable. If the method according to the invention is carried out in compressed zones with moisture accumulation as it occurs for instance when heavy working and harvesting machines drive over the soil, especially in the driving tracks of row cultures, etc., the pressing of the air into the soil brings about first a partially fountain-like escape of the water. With a deeper loosening and a corresponding breaking up of the compression levels (Verdichtungshorizonte), the water will then audibly be withdrawn. Aside from such drainage effects, as they can be frequently smelled, by way of loosening the soil without destroying the soil structure, also sewage gases will be displaced and thus sticky soil zones are aerated and revived. The method according to the invention may be carried out manually as well as mechanically by means of relatively simple devices, and for practicing the method principly merely one device is necessary which is characterized primarily by at least one probe (Sonde) insertable into the soil which probe has associated therewith a compressed air conduit adapted to be closed off, while within the region of the section to be inserted into the soil said probe is provided with at least one air outlet opening. The shut-off of the compressed air supply is expediently effected by a fast closure valve.

If the probe is used manually, it has expediently associated therewith a handle which preferably also comprises the fast closure valve. The said handle may preferably be designed in a way which corresponds to customary handles associated with compressed air hammers. In addition to the manual employment, also a mechanical employment is, of course, possible, in which instance a plurality of probes may be associated with a supporting frame which in its turn is for instance arranged on a three-point suspension of a tractor or the like, said tractor, if desired, may also drive the source of compressed air, in other words, a corresponding compressor.

The supporting frame in its simplest design may comprise primarily a supporting beam along which a plurality of probes may be provided. Expediently, devices may be provided which make possible a change in the distance of the probes from each other. Thus, it is within the scope of the present invention, that the supporting beams may have associated therewith a greater number of probe holding means which make possible a changing of the probes. Furthermore, the supporting beam may, if desired, be provided with means for holding members for probes. Such holding members make possible a plugging of the probes to different holding means. If desired, the supporting beam may within the framework of a particularly preferred embodiment be provided with slide guides for the probe holding means or with slide holding members for the probes so that the probes will be adjustale as to the distance from each other in a substantially infinitely variable manner. With a corresponding design, the supporting beam may at the same time serve as compressed air guiding means, and the supporting beam may have associated therewith connections for the compressed air supply of the probes. These connections may be for instance formed by fast connecting valves which are adapted to be connected to the probes via corresponding hose connections.

In addition to an adjustment of the probes in the longitudinal direction of the beam, these probes may within the framework of the present invention also be adjustable in the direction of height relative to the beam so that the device can be adapted to different plug-in depths. In addition to one supporting beam, the supporting beam may, of course, also be composed of a plurality of supporting beams or a network of support beams in order to cover major working areas. Principally, such supporting beams will in such an instance comprise connecting means for the probes which connecting means correspond to those which have been described in connection with the above mentioned supporting beam.

If one supporting beam is provided, practically only one intermittent operation is possible which means that the supporting frame with the tractor or a comparable supporting carrier is offset about a corresponding working section.

However, according to the invention also a continuous operation is possible in which a corresponding correlation between advancing speed and employment period of the probes in the soil has to be provided. Principally, such devices will then be designed in the manner of a spool or reel with controlled prongs while through the intervention of the rotation of the spool or reel, the probes comparable to the spool prongs are substantially vertically introduced into the soil and pulled out therefrom. The supply of compressed air may be effected by spool beams to the probes while the control of the supply of compressed air may be controlled in conformity with the rotary position of the spool. Such continuous working operation naturally requires a greater number of mechanical parts and is particularly preferred for narrow meshed loosening work but is less suitable for the coarse machine loosening of particularly tightly compressed soil.

The spool-like devices may be of the rotating as well as of the circulating type. A continuous mode of operation within the framework of the present invention can also be realized by suspending sliding sleeves over parallelogram linkage means which permit an equalization of the advancing movement.

For working on large surfaces and in particular in the open field, it is expedient within the framework of the present invention to work with a movable compressor station, for instance with a tractor equipped with a compressor. Expediently, also correspondingly large air collecting containers or air storage means may be associated with the tractor.

In particular in gardening operations, however, also a stationary air supply may be employed to which corresponding hoses may be connected.

While for small operations or small working areas for manual operation as well as for stationary supply, if desired through corresponding long hose connections, that method according to the invention may be employed which requires the least capital investment, it will be appreciated that for large operations and large areas, movable power stations will be employed which expediently also serve as probe carriers. In connection with such power stations, the movement of the probes for carrying out the method may be effected pneumatically, hydraulically or mechanically. If desired, especially with tractors as movable power stations, lifting devices associated with such power stations are employed so that separate investments will not be necessary within the framework of the present invention. Also, with such movable power stations, hardly any new soil compressions will be created thereby inasmuch as no pulling forces are necessary. If, directly following the loosening of the soil by the method according to the invention, organic substances or fertilizers are to be introduced into the soil, it is also possible within the framework of the present invention to introduce such organic substances or fertilizers into the soil by the probes employed for blowing in air. In this connection, preferably in the connection of the probe to the supply of compressed air, an injector may be provided by means of which the supply is effected into the probe. However, separate connections for the supply of the filling substances or filling and/or fertilizers may be associated with said probes while these substances can be introduced by means of a separate delivery pump. For intproducing the fertilizer, filling substances and loosening substances, also special probes may be employed. If no manual operation takes place, the supporting frame may be provided with corresponding connections for supplying the mentioned substances to the probes. The carrier for the device, in other words in particular the tractor, is expediently provided with a corresponding supply or storage container for the said substances.

It is, of course, also possible to provide for instance a separate carriage which carries the mentioned devices and which has associated therewith a tractor as driving means. Such carriage may also be designed as a self-propelling implement carriage so that also with such an arrangement a considerable advantage is obtained, namely the complete operation without pulling power.

If with the operation according to the invention filling and/or fertilizer substances are introduced, this is effected, starting from the breaking up of the soil, so that these operations directly follow each other and that the filling and/or fertilizing substances can accumulate in the hollow spaces created by the loosening of the soil and can keep open said hollow spaces.

By means of the method according to the invention, the soil is loosened at considerable depth and it is thus merely necessary for instance for preparing a seed bed, to loosen the soil upper surface by means of an aimed or a locating tool at a relatively flat ground and to crumble the soil while "green" fertilizers, compost, manure, if desired supplemented by mineral fertilizer, may be intermixed with the soil.

With such a process, the life of the soil is first at the air and oxygen-free surfaces provided with all the substances necessary for preserving the soil and for nourishing the plants. By the surface water seeping into the ground, these substances will with a corresponding loosening of the soil in conformity with the present invention pass into the lower soil layers and will be made use of in view of the newly created sound soil structure. A soil fed in such a way will also in the deeper soil layers become more and more independent of additional supply of organic substances such as peat humus and the like, and in view of the natural process, a self supply is obtained so that it is no longer necessary in connection with each processing of the upper soil zone, in other words in connection with the seed bed preparation, to employ the method according to the invention. This is true all the more inasmuch as due to for instance for preparing the seed bed, the necessary but only flat processing, the always created root masses remain undisturbed in the ground and like the other remaining plant residues are transported by the life of the soil itself into the lower layers in which due to the method according to the invention a permanent effective supply vein network is created which is necessary for a plentiful soil life.

Although, as mentioned above, the method according to the invention is particularly effective where the soil is dense (individual grain structure or compressed structure) also in loose soil, a considerable regeneration of the soil is obtained by the deep oxygen supply, especially when in addition to organic substances also fertilizers are blown in. In such soil which is healthy in itself, the method according to the invention represents a treating step which prevents the occurrence of the above mentioned soil damage and damage to the soil structure and aids in maintaining the soil in a healthy condition.

Referring now to the drawings in detail, it will be appreciated that in the various drawings in which different employment possibilities of the method according to the invention for loosening the soil are explained, for the sake of simplicity always the same diagrammatically illustrated device is employed which shows the essential features called for by the particular work to be carried out. This device comprises an air compressor 1 which is followed by an equalizing and storage container 3 and in the illustrated showing is through a pipe or hose conduit 2 connected to the air compressor 1. From the container 3, the conduit 4 leads to the working element 4 which comprises a handle 5 with fast shut-off valve and with a tubular probe 6 connected thereto. Within the region of the merging of handle 5 with probe 4, which probe is preferably provided with a pointed end with at least one preferably, however, a plurality of air exit openings 7, a feeding line 9 leads through the intervention of an injector 10 with shut-off valve toward the probe 6 which is connected to a storage container 8. By means of said feeding line 9, especially organic filling or fertilizing substances as well as mineral fertilizer or the like can be added to the air flow. If desired, also a separate delivery pump may be associated with said feeding line 9 through which delivery pump the filling and/or fertilizing materials can be introduced after the soil has been broken open, while the supply of the mentioned substance may be controlled by a corresponding shut-off valve. By means of the fast shut-off valve which controls the supply of compressed air, the said shut-off valve may, if desired, be combined to form a follow-up valve (Folgeventil).

FIG. 1 shows the employment of such a device in connection with the improvement of the permeability of deeper soil layers in order in this way to cause accumulated water to seep and to loosen the hardened soil so that the latter will be loosened for the roots of plants and will be aerated.

To this end, the probe 6 which in this instance is of a tubular design is first pushed into the soil up to a desired depth while the desired depth corresponds to the intended depth of soil loosening. Subsequently, possibly in a shock-like manner, the compressed air is introduced while with regard to the possibly shock-like effect upon the soil, the operation will be carried out at high pressure and with possibly large, free cross sections. The compressed air will then penetrate first into the soil which surrounds the exit openings 7 (see dash line lowered position of the probe) and the air accumulates in the gaps, tears and hollow spaces which are also present in soil compressed to a greater extent. The gaps, tears or hollow spaces thus become compressed air chambers and by the air pressure are widened while the air breaks open the gaps, tears and hollow spaces at the rims thereof, widens the same and thereby spreads in the soil. The expansion of the air over the above mentioned path and the effect of the air pressure on ever larger surfaces brings about that eventually the pressure load of the acted upon surfaces is greater than the corresponding surface load and resistance offered by the soil structures, depending on the depth of insertion of the probe. The soil is correspondingly in an eruption-like manner broken open over a large surface in conformity with the expansion of air, and this occurs while a number of breakage areas, gaps, tears and hollow spaces as shown in FIG. 1 by the dash lines 11, is formed.

According to the method referred to in connection with FIG. 1, the soil is lifted up to a plurality of square meters around the input area of the probe, is moved and broken up, the obtained loosening is, however, relatively large meshed and therefore substantially presents a step which is considered as fast help for particular situations, especially relatively highly compacted soil. The perforation spots for the probe may in this connection be arranged at relatively great distances for instance at distances up to about 1 meter, so that only about 100 perforation spots cover 1 Ar. Inasmuch as the pushing in of the probe also with the here mentioned and illustrated manual process with manual simple probe takes only from about 5 to 10 seconds, it is possible, as has been found by experience, to treat a surface of 1 Ar by means of a non-illustrated probe in approximately two hours. Devices with multi-probes, and in particular such devices according to which the probes are pressed into the soil by an auxiliary force, permit naturally a very high surface output.

Figure 2:
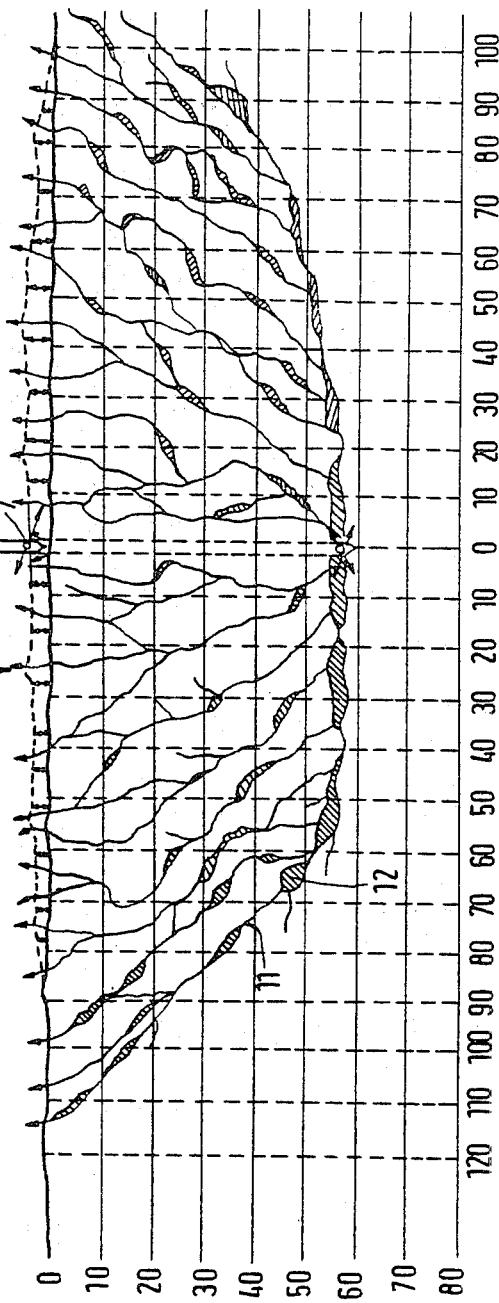

FIG. 2 illustrates the operation of the method according to the invention when, preferably after tearing open the soil, filling and/or fertilizing substances are introduced into the soil.

The introduction of said substances is effected in the following manner: by means of the injector 10 with associated shut-off valve, said substances are, after opening the fast closure valve at the handle 5 caught by the compressed air and carried away from the storage container 8. The mentioned substances enter the created hollow spaces 12 and accumulate therein as well as in the gaps and tears 11. In view of this deposit, a so-called blocking of the hollow spaces 12 and gaps and tears 11 occurs which means that the said spaces and gaps are filled and stiffened particularly by the dried substances which have a meal or granulated shape, inasmuch as these organic substances swell after intake of moisture and thus increase in volume. Additionally, they absorb moisture, thus assure a certain storage effect, and are air permeable.

As blocking substances, in other words as preferred following the organic feed and fertilizer substances introduced for the loosening proper, among others, fine grained humus, sand, organic synthetic compounds (polystyrol-mull), grain or ground fertilizer, mineral fertilizer and the like, may be employed. In addition to the aeration which is realized by the blocking up, this substance also serves to reduce the mechanical resistance of the soil, to increase its permeability for water, and to loosen the soil for the life thereof and the plant roots. By means of FIGS. 3a-3c, the effect of the method according to the invention will be explained in connection with the general loosening of the soil and the aerating thereof while the basic structure of the device remains the same.

With the general loosening of the soil and with the aerating thereof, the probe is first pushed into the soil only up to a minimum depth dependent on the type of soil and necessary with regard to the air distribution in the soil. As a rule, the probe is pushed into the ground to a depth of from 10-15 cm whereupon the probe is during the supply of compressed air lowered further. As will be seen from FIGS. 3a-3c, the soil is with increasing penetration depth of the probe, also broken open to a greater width.

Specifically, FIG. 3a shows the start of the loosening of the soil while the probe, as is indicated by dash lines, is inserted into approximately 15 cm depth before the supply of compressed air starts. When further pressing-in the probe, the position according to FIG. 3a will be reached in which while widening the breaking up zone, a penetration depth of approximately 30 cm is reached. When further advancing the probe, the end position according to FIG. 3c is reached in which the soil is loosened up over a depth of about 60 cm. Although the insertion in advance of the probe is effected in a continuous manner, the breaking up of the soil is clearly noticeable in individual operations. This is due to the fact that essential break-ups occur always only after the pressure level necessary therefor has been established in the pressure chambers which form. Inasmuch as these breaking up operations are audible (heavy sounds), it is possible without poking into the soil to obtain and control the desired loosening of the soil.

With such loosening of the soil which may likewise cause passages in the form of gaps and tears 11 and hollow spaces 12, it will be appreciated that in comparison to the method according to FIG. 2, a narrow meshed and fine breaking up of the soil will be realized. Furthermore, the respective breaking up range is smaller and has a radius of from 40-80 cm with regard to the probe as center. The influence of the type of soil and the soil condition on the respective texture of the break structure is also with this method considerable and it can be ascertained that the effect of the method according to the invention at the surface is clearly observable, and a clear indication or index for the state of cultivation of the soil. With a soil which is biologically intact and in a good state of cultivation, a visible breaking effect may not occur. Nevertheless, also in such an instance, the method according to the invention will be useful and expedient inasmuch as an advantageous gas exchange occurs in the soil and an intensive oxygen supply occurs with corresponding stimulating effect upon plants, roots and life of the soil. The poorer the condition of the soil, the more will the steps according to the invention create marks visible from the outside, namely by corresponding tear and gap forms.

Figure 3B:
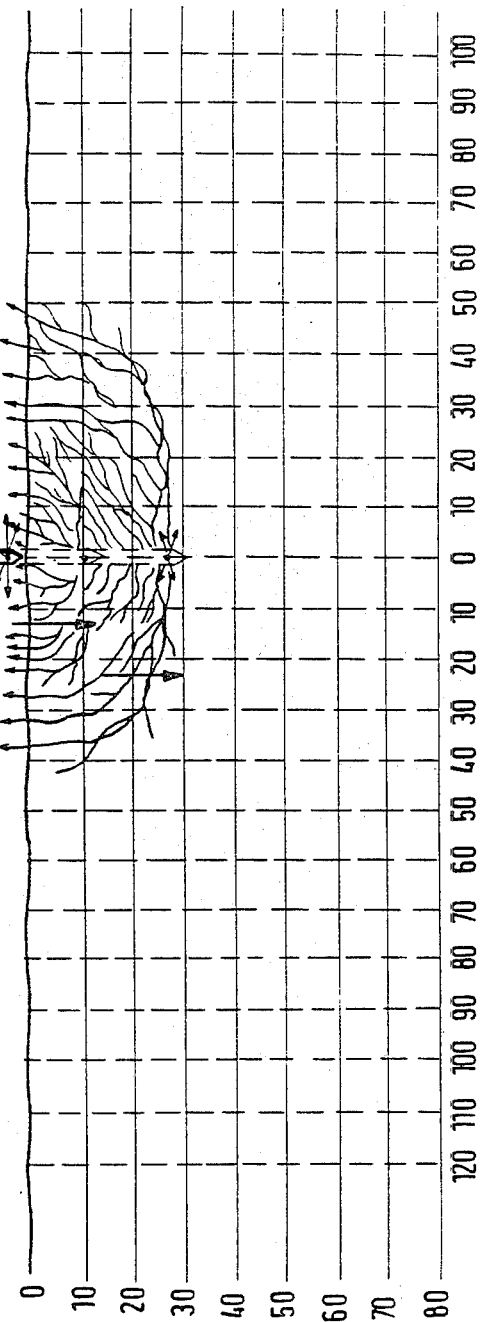

With the method according to FIGS. 3a–3c, the obtainable surface output is due to the reduced effect in width somewhat less around the individual probe than is the case with the method described in connection with FIG. 1. In connection with the mechanical loosening of the uppermost ground layer which covers a flat soil and in which the loosening extends to a depth of about 4–6 cm, such loosening of the ground is still an ideal regeneration and cultivating step which creates excellent seeding and growing conditions.

Although with soil which is treated by the method described in connection with FIGS. 3a–3c, the conditions for a normal growth are not as bad as with soil which has to be treated according to the method described in connection with FIG. 1, also here a "blocking up" of created hollow spaces and tears has proved expedient in order to assure an optimum effect over a longer period of time by the method according to the invention.

The method during the blocking up after a loosening of the soil according to FIGS. 3a–3c differs from that which was described in connection with FIG. 2 primarily in that not only at the region of the maximum loosening depth blocking up materials, in other words, filling and fertilizer substances are blown in, but this occurred substantially over the same height over which the loosening operation was conducted from the top downwardly. In contrast to the breaking open of the soil, the introduction of the blocking up substances is preferred but not from the top downwardly, but in the reverse direction so that the operation of the blocking can continuously follow the operation of the loosening and breaking up which is completed when the maximum loosening depth has been reached. Correspondingly, the blowing-in of blocking substances which was started at the maximum loosening depth, is preferably stopped at the minimum loosening depth of from 10 to 15 cm. By this minimum loosening depth is, as previously mentioned in connection with the loosening of the soil, meant that depth at which the compressed air will already accomplish loosening work, which means laterally enters the soil and does not substantially flow out upwardly along the probe only.

The blocking of the hollow chambers 12 and gaps and tears 11 is in conformity with FIG. 4 effected also in upward direction whereby it will be assured that the hollow spaces created during the breaking up from above in downward direction not only have remained open for the introduction of the blocking substances, but are again subjected to pressure but this time in upward direction whereby precisely under the influence of the additionally introduced blocking substances, a further refinement of the soil texture will be obtained.

This method creates a particularly deep soil cultivation which creates the best conditions for fertilizing, post-fertilizing, aerating and the like. In particular, when treating the soil a plurality of times in comformity with the method according to the invention, a soil structure will be obtained which creates the best condition for the growth of particularly quite demanding, very refined cultivated plants.

Figure 5:
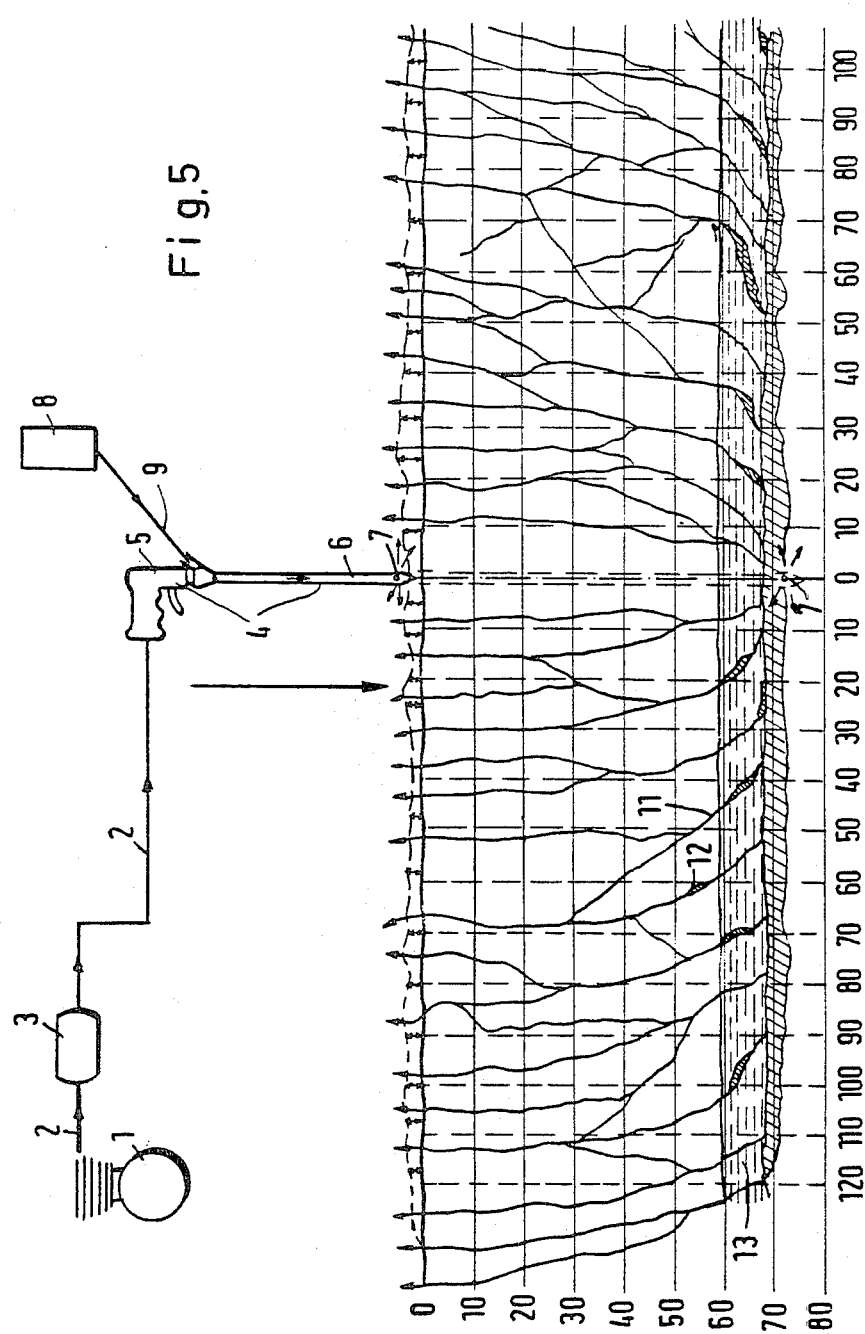
FIG. 5 shows the device according to FIG. 1 while breaking open deeper and extremely deeper lying compressed soil zones for elimination of accumulated moisture.
Figure 6:
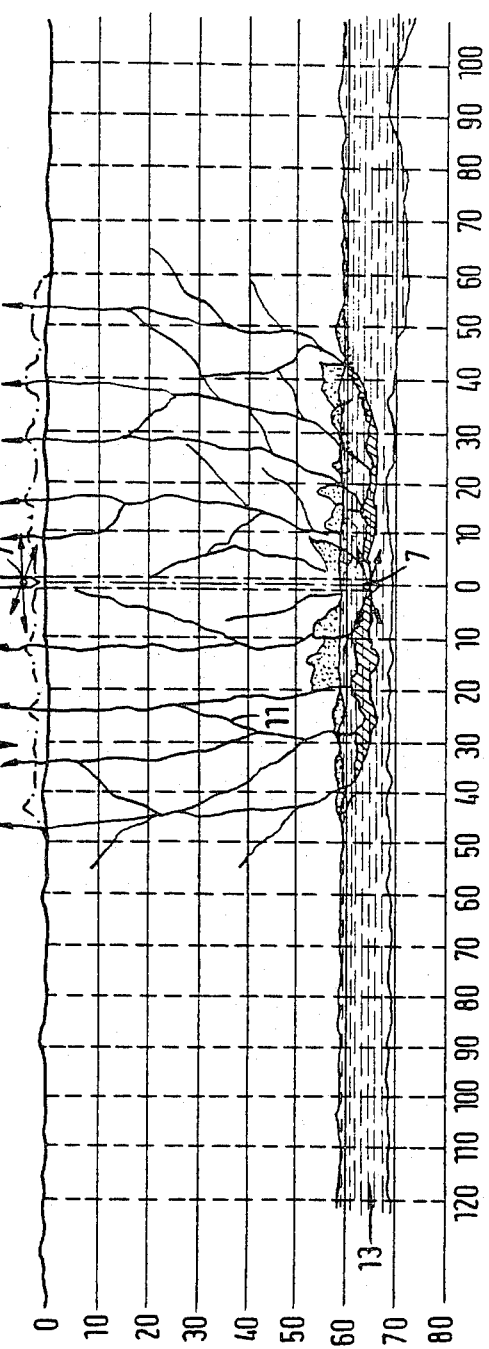
FIG. 6 illustrates the introduction of filling and, as the case may be, also fertilizers into the soil loosened in conformity with FIG. 5.

FIGS. 5 and 6 illustrate that the method according to the invention is also suitable for breaking up deep and extremely deep compacting zones which impede the growth of cultivated plants and may lead to an accumulation of moisture and souring of the soil. When employing the method according to the invention to implements heretofore used for overcoming such compacting zones, which implements all work mechanically and require considerable driving power, it is possible to eliminate these implements. Thus, it is possible to work with a considerably reduced investment, while it should be taken into consideration that the same fundamental equipment is principally provided for the loosening operations representing more or less a cultivation of the soil as well as for loosening operations employed for eliminating compacted zones. With the method described in connection with FIG. 4, the compacted zone 13 which is to be torn up is undercut which means that the probe has to be driven correspondingly deeper into the soil. To this end, for facilitating the driving-in operation, a certain reduced air supply to the exit opening may be expedient also during the driving-in operation, especially into deeper zones. If the compacted zone 13 is undercut by the air exit openings 7, the air supply will bring about the result that the compacted zone in toto is lifted and broken up. The soil will thus be lifted over a large surface and be broken up. In particular, in this way accumulated water can be quickly withdrawn from the ground surface, particularly in view of the fact that by one probe insert, an effect over a plurality of square meters can be realized.

Probes driven into the soil one adjacent the other will aid each other in their effect so that it will be possible to work over a great surface with comparatively few parts and comparatively little energy requirement.

With the method according to FIG. 6, the probe with its air outlet opening 7 is directly driven into the compacted zone 13, whereby the compacted zone is injected from the interior and thus is broken up in a more differentiated manner. Since the injection occurs directly into the compacted zone, it is necessary in such an instance to work more sensitively and more carefully. In addition thereto, particularly with this method, it may be prooved expedient to operate at a particularly high air pressure up to 18 atmospheres in order to tear open the more compacted one from the interior in the most possible fine condition. With the method according to FIG. 5 as well as FIG. 6, the method according to the invention is particularly suited for underground loosening of soil having high humidity because in this instance the probe can be driven into the ground at lower pressure, and because the density required for the pressure development in the hollow spaces is greater so that the creation of new tears and gaps will be aided.

It is a matter of course that also when applying the method in connection with FIGS. 5 and 6 subsequently to the tearing open of the compacted zones, the blocking of the hollow spaces may be undertaken in order in this way to arrive at a permanent improvement of the soil structure also in greater depth, and to exclude a new closing of the heretofore compacted zone.

If the loosening of the compacted zone has been evident, the soil layers thereabove are loosened as has been described in connection with the preceding features.

For carrying out the method according to the invention beyond what has been described in connection with the drawing so far, it is, of course, possible not only to employ manually operable devices, but also mechanically operable devices in which instance entire groups of probes may be employed while said groups may be together or individually driven into the soil. At any rate, care has to be taken that the probes are in a corresponding yieldable manner supported relative to their associated holding means or relative to the supporting frame associated therewith while a yieldable support in transverse direction as well as in the direction of height has proved expedient. In order to avoid a deformation of the probe by the probe hitting upon stones in an inclined manner, it is advantageous to support the probe in transverse direction so that the probe can slide off. The probe should be supported in the direction of height in order to avoid breakage when the probe hits upon stones. The intended yieldable support may be realized by means of mechanical elements such as rubber guiding elements, springs or the like while in particular the yieldability in the direction of height should be correlated with the respective driving-in depths so that during the driving-in operation the probe will be able to deflect in counterdirection relative to the frame. This can be realized, especially at great driving-in depths in a simple manner by excessive load safety means which when a certain limit load has been exceeded release the probe and thus prevent its destruction. Such overload safety means are also possible when the probes are adjusted hydraulically or pneumatically. The hydraulic or pneumatic operation is particularly advantages when an individual control for the probes is desired.

It is, of course, to be understood that the present invention is, by no means, limited to the specific device and method set forth in connection with the drawings, but also comprises any modifications within the scope of the appended claims.

What I claim is:

1. A method of pneumatically loosening and breaking open agriculturally used soil from the surface down to a predetermined depth by means of compressed air introduced into the soil, the method comprising the steps of:
   (a) storing compressed air under high pressure in a storage container;
   (b) injecting said compressed air into the soil at said predetermined depth below the surface of the soil;
   (c) controlling said injecting step so that compressed air is released in at least one sudden burst and with sufficient pressure at said predetermined depth to pneumatically lift and erupt the soil, including the said surface, and form air guiding passages extending laterally and upwardly from the injection point to the surface of the soil, with the air escaping at the soil surface through such passages, and
   (d) introducing filling materials into said passages immediately following said injecting step to prevent collapsing and closing of said passages.

2. The method of claim 1, wherein the compressed air is released only at said predetermined loosening depth.

3. The method of claim 1, wherein the compressed air is initially released into the soil at said predetermined depth, after which the compressed air is injected at a lower depth or depths.

4. The method of claim 1 wherein said filling materials are selected from the group consisting of filling substances and fertilizers.

5. The method of claim 1 wherein the compressed air is released in a plurality of sudden bursts.

* * * * *